US012730789B2

(12) United States Patent
Schultz et al.

(10) Patent No.: US 12,730,789 B2
(45) Date of Patent: Sep. 8, 2026

(54) COMPOSABLE MODULAR PLATFORM

(71) Applicant: FAIR ISAAC CORPORATION, Minneapolis, MN (US)

(72) Inventors: Christopher Schultz, Eagan, MN (US); Jeffrey B. Smith, Newmarket (CA); Karissa Kay Kohn, North Saint Paul, MN (US); Prashant Jamkhedkar, Fremont, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

(21) Appl. No.: 19/040,494

(22) Filed: Jan. 29, 2025

(65) Prior Publication Data

US 2026/0220108 A1 Jul. 30, 2026

(51) Int. Cl.
*G06F 16/00* (2019.01)
*G06F 16/21* (2019.01)

(52) U.S. Cl.
CPC .................................. *G06F 16/219* (2019.01)

(58) Field of Classification Search
CPC .................................................... G06F 16/219
USPC ......................................................... 707/654
See application file for complete search history.

(56) References Cited

U.S. PATENT DOCUMENTS

| | | | |
|---|---|---|---|
| 9,754,122 | B1 | 9/2017 | Christopher et al. |
| 9,774,586 | B1 | 9/2017 | Roche et al. |
| 11,502,992 | B1 | 11/2022 | Koponen et al. |
| 12,099,428 | B1 | 9/2024 | Agarwal et al. |
| 12,652,779 | B1 | 6/2026 | Woodward |
| 2019/0220867 | A1 | 7/2019 | Karani et al. |
| 2019/0310899 | A1 | 10/2019 | Oravivattanakul et al. |
| 2021/0006933 | A1 | 1/2021 | Dean |
| 2021/0248205 | A1 | 8/2021 | Tank et al. |
| 2021/0383005 | A1 | 12/2021 | Varga et al. |

(Continued)

OTHER PUBLICATIONS

Poole, J.D. (Apr. 2001) . "Model-Driven Architecture: Vision, Standards And Emerging Technologies." 15 pages. Web. Apr. 21, 2025. https://www.omg.org/mda/mda_files/Model-Driven_Architecture.pdf.

*Primary Examiner* — Chelcie L Daye
(74) *Attorney, Agent, or Firm* — Mintz, Levin, Cohn, Ferris, Glovsky and Popeo, P.C.; F. Jason Far-hadian, Esq.

(57) ABSTRACT

A method for managing assets in a modular platform, the method comprising maintaining a plurality of declarative protocols to standardize interaction semantics between a plurality of assets in a protocol repository, wherein each declarative protocol specifies interaction rules for at least one specific asset, and each declarative protocol is configured to support versioning when a predetermined condition is met, the versioning maintains compatibility between different versions of declarative protocols during updates or transitions; in response to an asset integration to the modular platform, selecting a declarative protocol from the plurality of declarative protocols based at least in part on an asset type or operational requirements associated with the asset to be integrated to the modular platform; and determining a version of the selected declarative protocol based on a predefined protocol resolution; wherein the protocol repository comprises a metadata indexing mechanism for managing and retrieving declarative protocols and their corresponding versions.

20 Claims, 5 Drawing Sheets

(56) References Cited

U.S. PATENT DOCUMENTS

2022/0166839 A1 5/2022 Vihar et al.
2023/0251835 A1 8/2023 Manohar et al.
2023/0418958 A1* 12/2023 Kanderal ........... G06Q 10/0635
2024/0283795 A1 8/2024 McCormick
2024/0411523 A1 12/2024 Bruno et al.
2024/0411569 A1 12/2024 Bruno et al.
2025/0373447 A1 12/2025 Wang et al.
2026/0080053 A1 3/2026 Tirupati et al.

* cited by examiner

400

COMPOSABLE MODULAR PLATFORM

TECHNICAL FIELD

The subject matter described herein relates to modular platform technology, specifically systems and methods for managing and integrating diverse assets through declarative protocols. This technology enables dynamic and flexible interaction across various asset types, supporting standardized cross-cutting interaction semantics and version compatibility to facilitate integration and scalability in complex operational environments.

BACKGROUND

In various industries, such as software development, financial services, and data management, the ability to integrate and manage diverse digital assets in a unified platform has become essential for efficient operations. Organizations often employ different types of assets—such as business rules, feature calculations, analytical models, and optimization strategies—each with unique requirements for communication and operation. Traditional methods of integrating these assets often rely on custom configurations or rigid interfaces, which may struggle to accommodate new assets or adapt to changing operational needs. As a result, these methods can lead to limited scalability and increased maintenance complexity, hampering the flexibility of the platform as assets evolve or new types of assets are introduced.

Current integration approaches often treat assets in isolation or within tightly controlled subgroups, requiring manual setup and maintenance to ensure each asset can operate effectively within the platform. This practice can be time-consuming and may lack the flexibility to adapt to rapid changes, such as updates in asset functionalities, security requirements, or performance standards. Moreover, managing compatibility between different asset versions and ensuring seamless communication between them can become increasingly challenging as the platform grows in complexity.

There is a need for advanced systems that can streamline asset integration across a modular platform by defining a standardized yet flexible framework for asset interaction. Such a system would ideally support diverse asset types, enable automated version compatibility management, and allow for dynamic interaction adjustments in response to changing operational requirements. By enabling flexible integration and scalable asset management, such a system would facilitate operational efficiency and adaptability across various industries, ensuring that digital platforms remain resilient to the evolving needs of their environments.

SUMMARY

Methods, systems, and articles of manufacture, including computer program products, are provided for managing assets in a modular platform. The computer-implemented method for managing assets in a modular platform comprises maintaining a plurality of declarative protocols to standardize interaction semantics between a plurality of assets in a protocol repository, wherein each declarative protocol specifies interaction rules for at least one specific asset, and each declarative protocol is configured to support versioning when a predetermined condition is met, wherein the versioning maintains compatibility between different versions of declarative protocols during updates or transitions; in response to an asset integration to the modular platform, selecting a declarative protocol from the plurality of declarative protocols based at least in part on an asset type or operational requirements associated with the asset to be integrated to the modular platform; and determining a version of the selected declarative protocol based on a pre-defined protocol resolution; wherein the protocol repository comprises a metadata indexing mechanism for managing and retrieving declarative protocols and their corresponding versions.

In some variations, each of plurality of the declarative protocols comprises structured definitions of interaction rules, versioning information, deployment requirements, security rules, and error handling protocols for the at least one specific asset.

In some variations, the method further comprises composing two or more assets into an asset package based on the declarative protocols associated with the two or more assets; and deploying the asset package into a specified environment based on the deployment requirements defined in the declarative protocols associated with the two or more assets in the asset packages.

In some variations, the pre-defined protocol resolution comprises determining a declarative protocol version from a plurality of available versions of the selected protocol based at least in part on the asset type, protocol attributes, and predefined operational requirements associated with the asset.

In some variations, the protocol repository further comprises a version compatibility matrix that maps each declarative protocol version to compatible asset types and operational scenarios.

In some variations, the method further comprises implementing access control policies within each declarative protocol, wherein the access control policies define permitted user roles, authentication requirements, and data access levels for interacting with each asset In some variations, the method further comprises in response to a newer version of the selected declarative protocol being available in the protocol repository, verifying compatibility of the newer version with predefined operational requirements for the associated asset; and updating the selected protocol version to the newer version if compatibility is verified.

In another aspect, there is provided a computer program product including a non-transitory computer readable medium storing instructions that, when executed by at least one programmable processor, cause the at least one programmable processor to perform operations. The operations include maintaining a plurality of declarative protocols to standardize interaction semantics between a plurality of assets in a protocol repository, wherein each declarative protocol specifies interaction rules for at least one specific asset, and each declarative protocol is configured to support versioning when a predetermined condition is met, wherein the versioning maintains compatibility between different versions of declarative protocols during updates or transitions; in response to an asset integration to the modular platform, selecting a declarative protocol from the plurality of declarative protocols based at least in part on an asset type or operational requirements associated with the asset to be integrated to the modular platform; and determining a version of the selected declarative protocol based on a pre-defined protocol resolution; wherein the protocol repository comprises a metadata indexing mechanism for managing and retrieving declarative protocols and their corresponding versions.

In another aspect, there is provided a system comprising: a programmable processor; and a non-transient machine-readable medium storing instructions that, when executed by the processor, cause the at least one programmable processor to perform operations. The operations include maintaining a plurality of declarative protocols to standardize interaction semantics between a plurality of assets in a protocol repository, wherein each declarative protocol specifies interaction rules for at least one specific asset, and each declarative protocol is configured to support versioning when a predetermined condition is met, wherein the versioning maintains compatibility between different versions of declarative protocols during updates or transitions; in response to an asset integration to the modular platform, selecting a declarative protocol from the plurality of declarative protocols based at least in part on an asset type or operational requirements associated with the asset to be integrated to the modular platform; and determining a version of the selected declarative protocol based on a pre-defined protocol resolution; wherein the protocol repository comprises a metadata indexing mechanism for managing and retrieving declarative protocols and their corresponding versions.

Implementations of the current subject matter can include, but are not limited to, methods consistent with the descriptions provided herein as well as articles that include a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
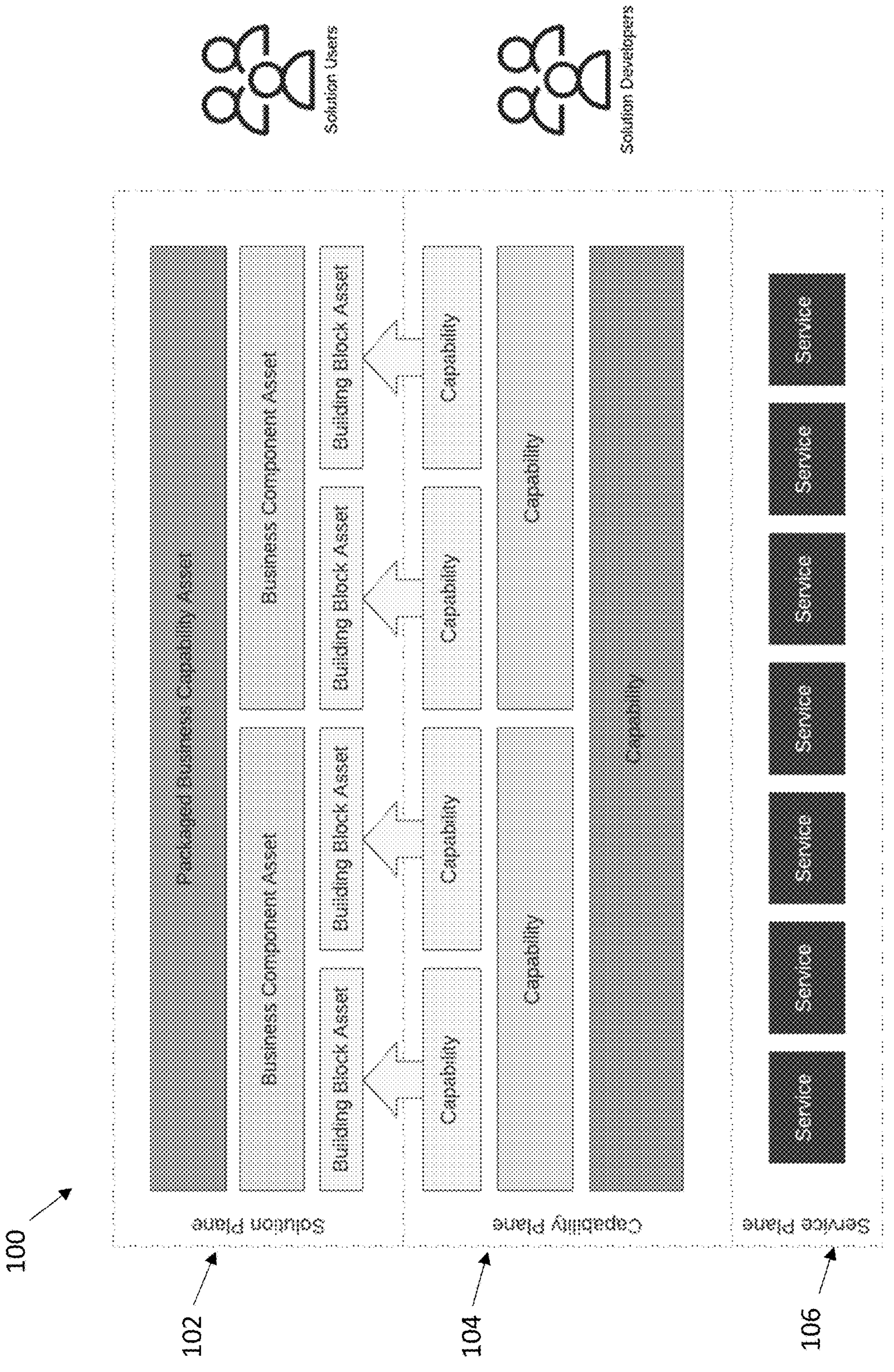
FIG. 1 is a diagram illustrating an example of a modular platform, in accordance with one or more embodiments of the current subject matter.

When practical, like labels are used to refer to same or similar items in the drawings.

DETAILED DESCRIPTION

The details of one or more variations of the subject matter described herein are set forth in the accompanying drawings.

The present disclosure relates to a modular and composable platform architecture configured to facilitate integration across a plurality of business capabilities, including decisioning, analytics, optimization, and data management. This architecture is enabled by declarative protocols and flexible asset management. In some embodiments, the declarative protocols are those that set standardized rules for how assets interact within the platform, specifying interaction semantics, versioning, and compliance parameters to ensure seamless integration. The platform incorporates standardized protocol semantics, modular components, and multi-tenant management strategies to address complex business requirements, providing enhanced scalability and operability. Monolithic architectures typically experience significant strain on system resources due to tightly coupled dependencies, which can cause loading and response delays. In such systems, even minor updates can lead to cascading effects across multiple modules, creating bottlenecks and increasing deployment complexity. In some embodiments, the composable platform capability provides a foundational architecture for implementing declarative cross-cutting asset semantics to achieve flexible composition and standardized management of assets. This may include defining standardized interactions between assets, thereby enabling seamless integration of assets within the platform. The architecture may also facilitate flexible deployment of business function modules, enabling efficient management processes while maintaining high scalability. In some embodiments, the composable micro frontends capability implements a modular frontend architecture for the platform, utilizing micro frontends to build user interfaces. This capability may leverage declarative protocols and module federation to enable dynamic loading and composition of frontend components. The micro frontends capability further supports the loading and embedding of user interface components without necessitating a complete recompilation of the application, thus allowing for flexible customization and expansion of user interfaces. This architecture may enhance user experience by enabling the adjustment of frontend interactions according to specific requirements. In some embodiments, the multi-tenant capability provides strategies for managing multi-tenant environments and organizational hierarchies, allowing for secure and flexible asset management in multi-user settings. This capability may include defining hierarchical organizational structures that manage asset sharing and data isolation between tenants. It may further support tenant isolation to ensure the separation of data and business logic across different tenants, thus meeting data privacy and compliance requirements. Additionally, this capability may include configurable policies that support the customization of platform functionalities and access rights based on specific tenant requirements, facilitating adaptable and secure asset management in complex multi-tenant environments.

In some embodiments, declarative protocols establish standardized rules that automate and maintain interaction semantics across varying asset types within the platform. These protocols define interaction semantics to guide asset interactions through specific rules and configurations that support both consistency and adaptability. By abstracting the technical configurations necessary for asset integration, declarative protocols allow assets to interact seamlessly and autonomously without requiring significant manual configuration. This abstraction enables assets to adapt dynamically to new operational requirements while adhering to pre-established interaction conventions, thus promoting continuity as assets evolve over time. As new assets or functionality updates are introduced, declarative protocols provide a cohesive framework that aligns asset behavior with platform-wide standards, reducing the need for custom adjustments while maintaining operational integrity across the platform. Declarative protocols not only establish foundational rules for micro frontend interoperability but also support dynamic updates and synchronization across components. For example, declarative protocols enable the platform to seamlessly adjust and propagate version changes without requiring manual reconfiguration, thus preserving the stability and continuity of user interfaces as components evolve.

FIG. 1 is a diagram illustrating an example of a modular platform 100, in accordance with one or more embodiments of the current subject matter. As show in FIG. 1, the modular platform 100 utilizes an architectural strategy for supporting composable capabilities. In some embodiments, the modular platform 100 comprises a solution plane 102, a capability plane 104, and a service plane 106. The service plane 106 provides centralized cross-cutting services that are accessible across the platform 100, including but not limited to observability, identity and access management, privacy, and security. The capability plane 104 comprises various capabilities that enable the creation, authoring, and composition of building block assets to be deployed in the solution plane. These capabilities may include authoring tools, deployment frameworks, and configuration interfaces that empower users to define, modify, and assemble assets according to specific operational requirements. Additionally, the capability plane accesses the cross-cutting services within the service plane 106, helping created assets comply with platform-wide standards and security protocols. The solution plane 102 consists of assembled and deployed building block assets, business component assets, and packaged business capability assets, collectively forming end-user solutions. Assets within the solution plane 102 leverage the services of the service plane 106 and the assets created in the capability plane 104 to deliver targeted business functionalities. Solution users may interact with these deployed assets directly via platform-provided interfaces or indirectly through third-party integrations, thereby enabling effective implementation of business solutions across various operational environments.

Figure 2:
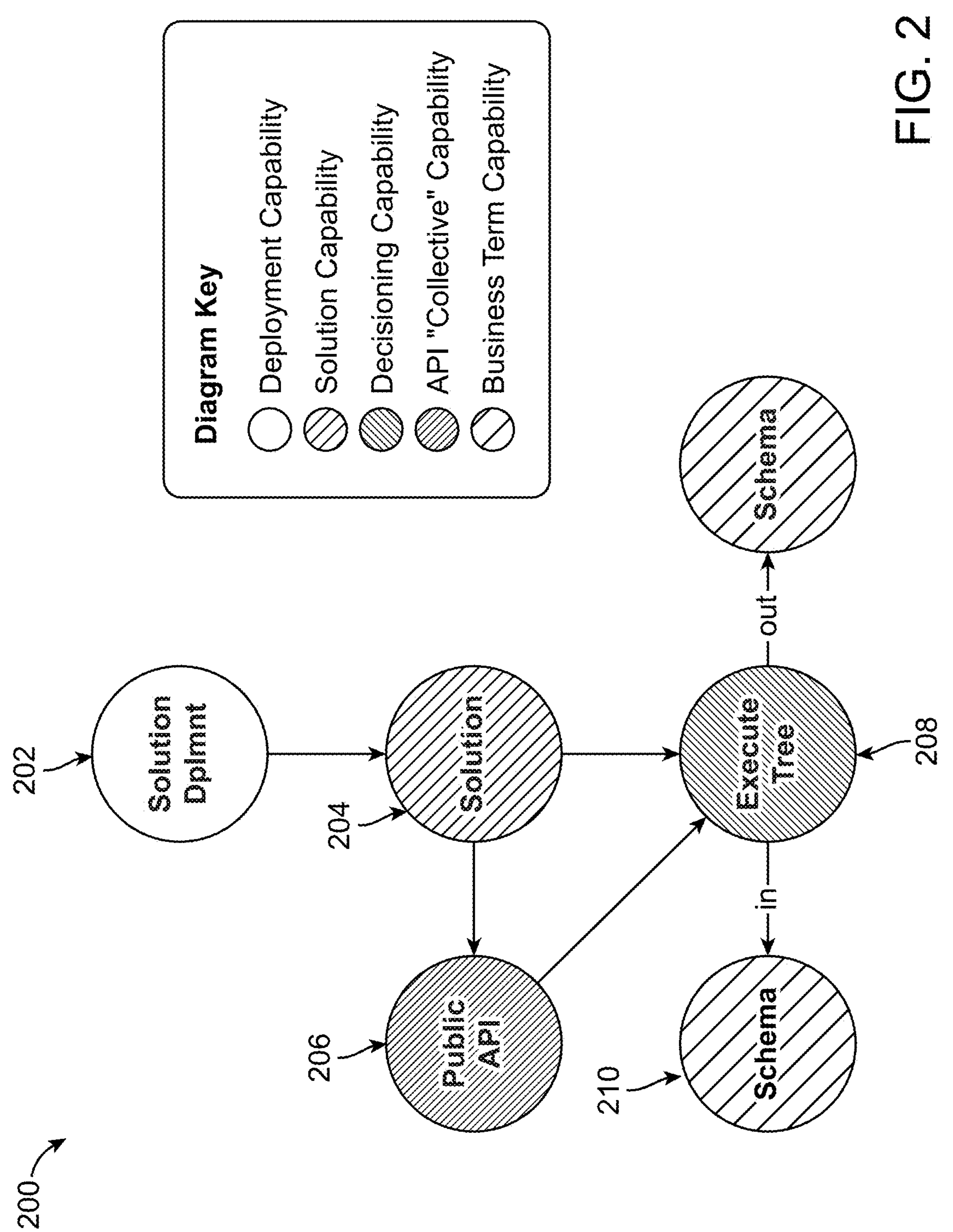
FIG. 2 is a diagram illustrating an example of a logical model for a modular platform, in accordance with one or more embodiments of the current subject matter.

FIG. 2 is a diagram illustrating an example of a logical model for a modular platform 200, in accordance with one or more embodiments of the current subject matter. As shown in FIG. 2, the modular platform 200 comprises components including solution deployment 202, solution 204, public API 206, execute tree 208, and schema 210. The logical model, which represents an intermediate abstraction layer, organizes these assets in a directed graph structure, where dependencies flow in one direction only, allowing assets that satisfy non-functional requirements to depend on functional assets without reciprocal dependencies. This directed structure supports reusability by enabling functional assets to be leveraged in various operational configurations while maintaining modular integrity across environments. In some embodiments, asset type refers to a classification distinguishing different types of digital components (e.g., analytics tools, databases, etc.) that the platform manages.

In this configuration, non-functional assets, such as security or performance enhancement components, can rely on functional assets while preserving the independence of the functional assets themselves. This ensures that functional assets remain reusable across different configurations without being constrained by specific non-functional requirements. As a result, functional assets can operate flexibly in diverse scenarios-such as batch processing, streaming, or real-time processing-without the need for modification. By establishing clear one-directional dependencies, the deployment process is also simplified; assets can be deployed in an orderly sequence, ensuring that all dependencies are resolved as the system progresses from functional to non-functional components, thus enhancing overall system reliability. Moreover, this structure allows for incremental system expansion, where non-functional requirements can be added or updated without altering the core functional assets, enhancing the platform's adaptability to evolving operational needs and supporting scalable growth across diverse environments. In this way, the directed graph structure achieves a balance between reusability, modular integrity, and adaptability, facilitating a system architecture that is both robust and flexible.

In some embodiments, solution deployment 202 orchestrates the integration and activation of assets defined within the solution plane 102 of FIG. 1. Acting as the central mechanism for deploying assets, solution deployment 202 aligns each asset's operational configuration with defined parameters, ensuring that all assets are appropriately initialized and accessible. This setup coordination involves dynamically managing the configurations across the logical model, allowing assets to be deployed with precise adjustments for varied operational requirements, such as batch processing, streaming, and real-time functionality. Through this dynamic configuration capability, solution deployment 202 facilitates streamlined, environment-specific deployments by customizing asset parameters, resource allocations, and runtime behaviors based on context-specific needs. Furthermore, solution deployment 202 provides monitoring and logging capabilities throughout the deployment workflow, ensuring that assets are activated in a structured, sequential manner, with continuous verification of system accessibility. By establishing a consistent, reliable deployment process that can adapt to both individual and combined operational requirements, solution deployment 202 enhances the platform's versatility, supporting a modular approach where assets are maintained independently yet operate cohesively within the solution plane. This not only reinforces reliability across various environments but also aids in scaling the deployment process, allowing multiple configurations to be executed concurrently or sequentially as required, thereby providing flexible support for diverse business functionalities.

In some embodiments, solution 204 comprises a cohesive set of assembled assets and business capabilities that deliver targeted functionalities to end users. Acting as a flexible execution environment, solution 204 encompasses building block assets, business components, and fully packaged capabilities. Within the modular platform, solution 204 is structured as a directed asset graph stored in the platform's repository, allowing assets within solution 204 to be efficiently searched, shared, and managed across different solutions, tenants, and organizations. This graph-based representation facilitates modularity by enabling assets to be individually managed and reused in multiple solutions while ensuring the cohesive operation of solution 204 as a whole. Functional assets within solution 204 are designed for reuse across diverse contexts without modification, providing a stable core that enables adaptability. Non-functional assets, which are dependent on these functional assets, allow solution 204 to be configured in multiple ways to meet specific non-functional requirements such as security, availability, and performance, without altering the core functional components. This configuration flexibility allows solution 204 to operate under varied conditions, from high-performance environments to secure and regulated contexts, enhancing both reliability and scalability across deployments.

In some embodiments, public API 206 operates as an external interface, enabling third-party integrations and external applications to access and interact with solutions deployed on the modular platform 200. Through this interface, public API 206 facilitates standardized interaction semantics, which ensure consistent access and interaction patterns, thereby extending the platform's reach and operability across various systems, wherein the interaction semantics refer to the standardized rules and conventions that define how assets communicate within the platform. API 206 enforces these semantics, facilitating uniform interactions, especially for third-party integrations, without necessitating custom configurations. This standardization also enables seamless integration with other systems, broadening the platform's capabilities by allowing external entities to utilize platform resources without needing to adapt to specific internal formats. Public API 206 achieves this interoperability by using platform-independent interface contracts, which are defined based on dependencies such as execute tree 208 and schema 210. These dependencies form structured interaction protocols and data formats, allowing public API 206 to interact consistently across different environments and ensuring that integrations remain stable and adaptable as the platform evolve.

Execute tree 208 offers a structured execution framework that organizes the operational flow and defines dependencies among assets within solution 204. By managing task sequences and respecting dependencies, execute tree 208 optimizes solution execution and coordinates asset interactions within the platform, ensuring efficient execution flow and compliance with operational requirements. In some embodiments, the execute tree 208 includes a platform-independent interface contract that supports consistent functionality across different deployment environments, enabling the solution's components to be invoked and executed in various configurations.

In some embodiments, execute tree 208 provides a structured execution framework that organizes the operational flow and clearly defines dependencies among assets within solution 204. This framework enables the modular platform to manage task sequences effectively, adhering to predefined dependencies that ensure each component executes in the intended order. By coordinating asset interactions, execute tree 208 supports optimized execution flow, improving efficiency across complex tasks while ensuring that each asset's operational requirements are respected. Execute tree 208 further enhances flexibility and adaptability by incorporating a platform-independent interface contract, which standardizes how solution components can be invoked and executed across different deployment environments. This consistency allows components within solution 204 to be deployed in diverse configurations without modifying their core functionality, supporting scalability and robustness of the platform across multiple operational scenarios.

Together, these components enable the modular platform 200 to support a flexible, composable architecture, where assets are efficiently deployed, managed, and accessed within and beyond the platform. This structured, layered approach enhances operability, scalability, and adaptability to diverse business requirements, enabling functional and non-functional assets to operate within the same logical model while maintaining clear boundaries in usage and dependency. The protocol repository and the associated version compatibility matrix (not shown) ensure dynamic versioning of declarative protocols, enabling each component to maintain compatibility with platform interaction standards across multiple deployment cycles.

Figure 3:
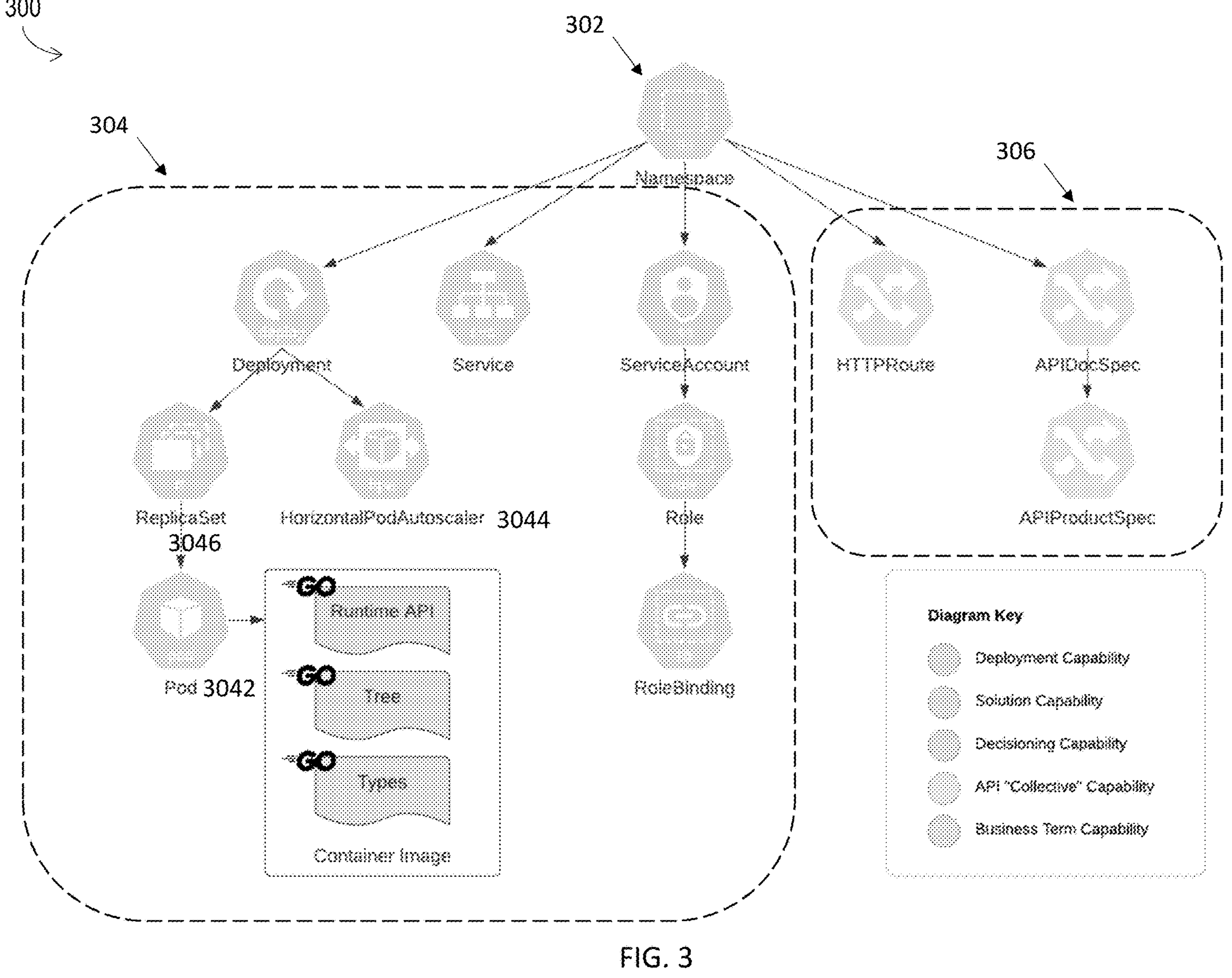
FIG. 3 is a diagram illustrating an example of a physical model for a modular platform, in accordance with one or more embodiments of the current subject matter.

FIG. 3 is a diagram illustrating an example of a physical model for a modular platform 300, in accordance with one or more embodiments of the current subject matter. The diagram labeled as FIG. 3 with its numbered components (300, 302, 304, 306, 3042, 3044, 3046) represents a physical implementation model of how the platform's components are deployed in a container orchestration system. In some embodiments, a container orchestration system may refer to a system that provides a managed ecosystem for deploying, scaling, and maintaining containerized applications, enabling resource isolation, automated scheduling, networking, and fault tolerance across distributed systems. In some embodiments, the container orchestration system comprises Kubernetes, Docker Swarm, or Apache Mesos environments. In some embodiments, the platform 300 represents the overall container orchestration system where the platform is deployed and may serve as the container orchestration layer that manages all the platform services and components. As shown in FIG. 3, the physical model of the modular platform 300 comprises namespace 302, deployment functions 304, and API functions 306. Namespace 302 and deployment functions 304 represent the primary segmentation units within the container orchestration system, for example, in the Kubernetes cluster. In some embodiments, in Kubernetes terms, these might be implemented as separate namespaces, which may provide the first level of resource isolation. In some embodiments, namespace 302 provides a containerized structure for organizing and isolating resources related to specific packaged business capabilities and their deployment configurations. Within namespace 302, distinct groupings may be established to encapsulate individual resource sets, ensuring isolation between different business solutions and their associated assets. Namespace 302 facilitates controlled resource grouping and allows specific configurations to be applied at a namespace level, supporting operational requirements like resource quotas, network policies, and role-based access controls. Deployment functions 304 represent the core workload deployments within the platform 300. Deployment functions 304 may include pods 3042 representing instances of a workload, which can be scaled dynamically based on demand through a HorizontalPodAutoScaler 3044. Each deployment function encapsulates a container image that houses decision logic (such as the Execute Tree logic), interface protocols, and additional runtime dependencies required for execution. In some embodiments, the pods 3042 may serve as an authentication service pods that handle user verification and token management. In some embodiments, the HorizontalPodAutoScaler 3044 may service as authorization service pods that implement the authorization logic. The deployment functions 304 are configured with policies for automated scaling and resilience, with ReplicaSet 3046 configurations that define the minimum and maximum numbers of pod instances, i.e., the ReplicaSet 3046 may serve as resource management pods that handle actual asset access and sharing. Deployment functions 304 can respond to operational metrics and maintain availability through automatic adjustment of resources, ensuring optimized performance and resource usage. API functions 306 encompass the routing and access controls for external communication with the modular platform 300. These include APIRoute configurations that define traffic routes from external sources (north/south traffic) to internal service endpoints. Each service endpoint routes requests across multiple instances of deployed workloads (pods) within the platform. In some embodiments, API functions 306 may serve as the service layer where the actual user group and access control mechanisms are implemented. This is where the RBAC (Role-Based Access Control) policies would be defined and enforced at the container orchestration system, for example, in Kubernetes environment. API functions 306 enforce strict network policies, such as rate limiting, load balancing, and load shedding, to regulate and control traffic, ensuring robust handling of incoming requests and consistent performance. Access restrictions within API functions 306 may include authentication requirements, thereby controlling and securing the interaction between external applications and the platform's deployed solutions. As discussed, the modular platform 300's physical model supports a structured approach to deployment, scaling, and external interaction. Namespace 302, deployment functions 304, and API functions 306 together create a flexible, isolated, and secure environment for deploying and managing packaged business capabilities across multiple operational contexts. This container orchestration system-based implementation provides a number of benefits, including improved security through isolated environments for each component, independent scalability of services based on demand, enhanced resilience with automated failure handling and service availability maintenance, and precise allocation and management of compute resources to ensure optimal resource efficiency.

In some embodiments, the modular platform includes a dynamic build pipeline to facilitate the transformation of the logical model into a physical model. This transformation leverages a series of orchestrated pipelines, each responsible for a specific subset of artifacts and configurations essential to the deployment of the platform's assets. The Business Terms Pipeline initiates the transformation process by generating runtime artifacts, including a Golang module with struct definitions and a JSON schema file representing the input/output requirements for the Execute Tree 208 interface. As the foundational pipeline, the Business Terms Pipeline is independent of other assets in the logical model, ensuring that schema dependencies are resolved before subsequent steps. Following the Business Terms Pipeline, the Tree Pipeline is configured to build additional runtime artifacts by generating a Golang module containing the logic of the Execute Tree 208. This logic is implemented as a function that adheres to the executable asset's defined interface or protocol. The Tree Pipeline is triggered only upon the completion of the Business Terms Pipeline, as it relies on the generated Golang module for interface parameters, ensuring accurate compilation and thorough testing of the code. The API Pipeline constructs Kubernetes manifests required for configuring the API Gateway. These configurations enable external traffic to access the deployed service within the Kubernetes environment, facilitating integration through a Public API 206. The API Pipeline also assembles an OpenAPI specification for invoking the containerized Tree function endpoint, encompassing the endpoint's input/output schemas. This API configuration is subsequently packaged and prepared for deployment to the platform's API portal, allowing third-party systems to interact with the deployed assets. The Solution Pipeline finalizes the transformation by constructing the runtime container image. This image includes a language-specific runtime, one or more executable assets, and the binding code required to integrate the runtime serving layer with the executable asset's functionality. The Solution Pipeline is also responsible for generating comprehensive Kubernetes manifests necessary for the deployment process. These manifests, alongside contributions from other capability pipelines, are staged within a tenant-specific Git repository that holds all deployable solutions, ensuring that each tenant's solutions are readily accessible for deployment. Upon the completion of the continuous integration process, the transformed solution progresses through the solution lifecycle, where the appropriate version of the staged solution is designated for deployment. This stage is monitored by continuous delivery pipelines, providing an automated mechanism for updating and overseeing the lifecycle of deployed solutions. In some embodiments, versioning enables protocols to evolve while supporting backward compatibility across different deployments. Each declarative protocol includes specific version identifiers, allowing the system to track and maintain compatibility between various protocol versions within the modular platform. To further support compatibility, a version compatibility matrix is integrated into the protocol repository, mapping each protocol version to compatible asset types and operational contexts. This matrix allows for a structured approach to updating protocols, ensuring that new protocol iterations align with existing configurations. By referencing this matrix, the platform dynamically adapts to new protocol versions without disrupting previously deployed assets, thereby facilitating a seamless and reliable update process.

Figure 4:
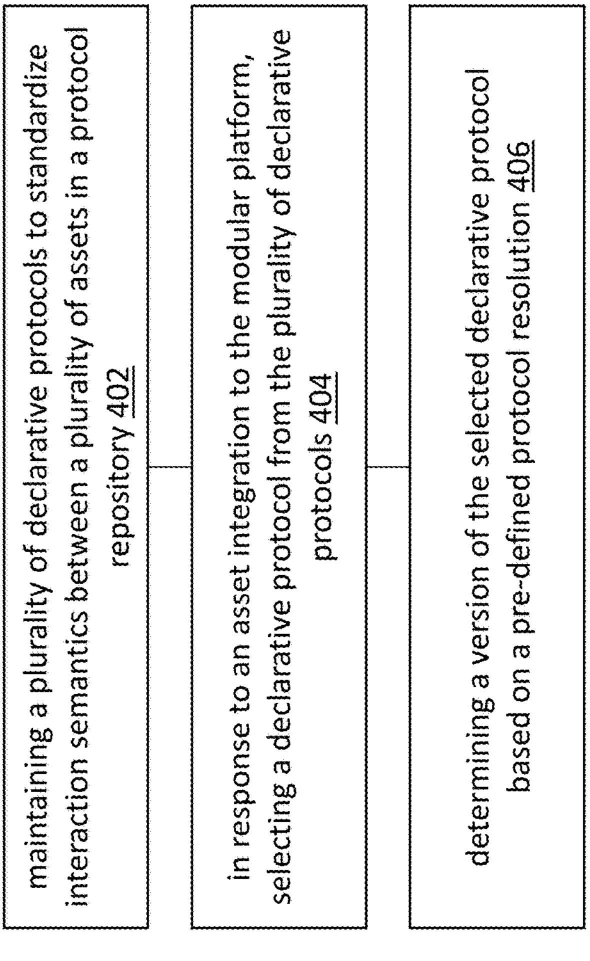
FIG. 4 is a diagram illustrating a flow chart of a process for managing assets in a modular platform using declarative protocols, in accordance with one or more embodiments of the current subject matter.

FIG. 4 is a diagram illustrating a flow chart of a process 400 for managing assets in a modular platform using declarative protocols, in accordance with one or more embodiments of the current subject matter. As shown in FIG. 4, the process 400 may begin with operation 402, where the system maintains, by a processor, a protocol repository containing a plurality of declarative protocols. In some embodiments, protocol repository is a centralized storage location for all declarative protocols, which holds and indexes protocols and their versions, enabling efficient retrieval and version control. Each declarative protocol standardizes interaction semantics for specific asset types and includes structured definitions such as interaction rules, versioning information, deployment requirements, security rules, and error handling protocols. In some embodiments, structured definitions are predefined sets of parameters within each declarative protocol, encompassing essential elements such as interaction rules, versioning schemas, deployment guidelines, and error handling protocols. These definitions ensure that each protocol uniformly includes all necessary details to govern asset interactions, updates, and deployment requirements within the modular platform. By standardizing these components, structured definitions enable consistent and reliable protocol behavior across different asset types and operational contexts, thereby enhancing interoperability, compliance, and error resilience throughout the platform's ecosystem. In some embodiments, a declarative protocol may provide a set of standardized, structured instructions that define how specific asset types interact within the modular platform. Each declarative protocol encapsulates a range of operational specifications, including detailed interaction rules, versioning data, deployment requirements, security policies, and error handling mechanisms, to ensure uniform behavior and compliance across diverse platform assets. By offering a declarative approach, these protocols abstract the technical configurations required for each interaction, allowing assets to be integrated without extensive custom coding. This abstraction layer enhances platform consistency, enabling assets to adapt seamlessly to new operational requirements while adhering to established interaction semantics and security standards, supporting both scalability and flexibility within the platform. In some embodiments, versioning is a system feature enabling protocols to support various iterations, ensuring backward compatibility across protocol updates. In some embodiments, versioning is a structured feature within the modular platform that manages multiple iterations of declarative protocols, preserving compatibility and stability across protocol updates. Versioning enables each protocol to maintain backward compatibility by associating specific versions with defined interaction rules, asset dependencies, and operational standards, thereby allowing new and legacy assets to coexist without disruption. This system feature includes a version compatibility matrix that maps each protocol version to compatible asset types and operational scenarios, supporting dynamic selection of the most appropriate protocol version for any given asset. Through this approach, versioning facilitates seamless protocol evolution while ensuring that updates do not interfere with existing configurations or operational workflows These protocols are configured to support versioning under predetermined conditions, ensuring compatibility across updates and transitions within the modular platform. In some embodiments, the protocol repository comprises a metadata indexing mechanism for managing and retrieving declarative protocols and their corresponding versions. In some embodiments, metadata indexing mechanism refers to a functional feature within the protocol repository that enables the efficient organization, searching, and retrieval of protocol versions. This mechanism indexes protocols based on metadata attributes-such as protocol type, version number, asset type compatibility, and operational requirements-allowing the system to rapidly locate and apply the correct protocol version during integration or deployment. By categorizing and structuring protocols through metadata tags and attributes, the metadata indexing mechanism facilitates streamlined protocol resolution and versioning management, supporting swift adaptation to platform updates and minimizing retrieval time for compatibility checks. This metadata indexing mechanism thereby enhances the repository's scalability and accessibility, allowing for efficient management of large volumes of protocols across diverse platform environments.

The process continues with operation 404, in which the system dynamically selects a declarative protocol from the protocol repository based at least in part on the asset type or operational requirements associated with an asset to be integrated into the modular platform. In some embodiments, the protocol selection may further include considerations of protocol attributes and predefined operational requirements, providing flexibility to meet diverse integration needs. This selection enables the appropriate protocol to be applied to new or modified assets according to platform standards. In some embodiments, operational requirements refer to specific performance or security criteria an asset must meet within its operational context. These requirements guide protocol selection, ensuring the correct version and interaction semantics for asset integration within the platform's modular architecture.

In operation 406, the system determines a version of the selected protocol by employing pre-defined protocol resolution criteria. In some embodiments, protocol resolution refers to the systematic mechanism used within the modular platform to dynamically select, validate, and apply the most compatible protocol version for each asset based on specific criteria, including asset type, operational requirements, and protocol attributes. This selection process ensures that assets adhere to standardized interaction rules by identifying the optimal protocol configuration needed for seamless functionality within the platform. In some embodiments, protocol resolution considers each asset's unique needs and dependencies, as well as compatibility across multiple platform versions, which are maintained through a version compatibility matrix that maps protocol versions to various asset and operational contexts The version compatibility matrix plays a key role during protocol resolution processing by providing compatibility data for various protocol versions relative to asset type and operational requirements. This matrix enables the platform to select an optimal protocol version that meets both current and legacy asset requirements, thus supporting smooth transitions between protocol iterations. This approach minimizes the risk of functional discrepancies or performance degradation due to version updates, enhancing the platform's adaptability across multiple operational scenarios. This adaptive approach reinforces stability and continuity, particularly during updates, by accommodating evolving protocols while preserving backward compatibility across deployments. For example, the version may be determined based on compatibility criteria maintained in a version compatibility matrix, which maps each declarative protocol version to compatible asset types and operational scenarios. Additionally, in response to a newer version of the selected declarative protocol becoming available, the system may verify compatibility with the predefined operational requirements for the associated asset and update to the newer version if compatibility is confirmed. This criteria-driven approach facilitates alignment of the selected protocol version with the operational needs of the asset, maintaining seamless integration and interaction consistency within the modular platform.

Figure 5:
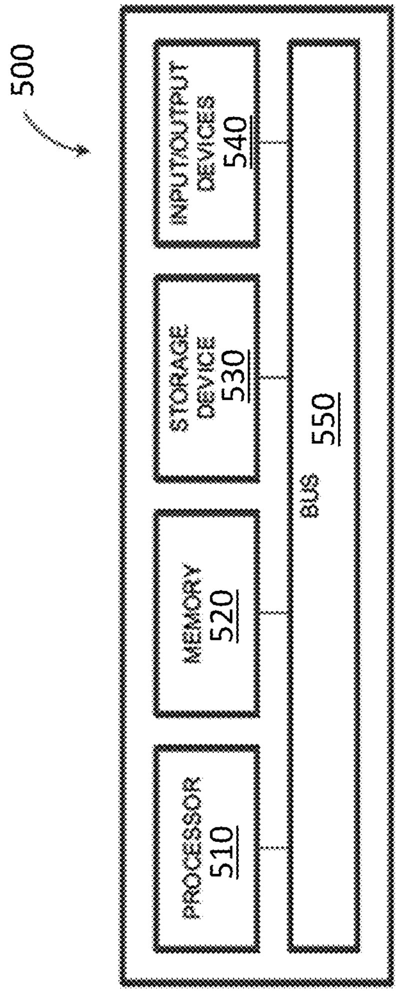
FIG. 5 depicts a block diagram illustrating a computing system consistent with implementations of the current subject matter.

FIG. 5 depicts a block diagram illustrating a computing system 500 consistent with implementations of the current subject matter. As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The computing system 500 may additionally or alternatively include a graphic processing unit (GPU), such as for image processing, and/or an associated memory for the GPU. The GPU and/or the associated memory for the GPU may be interconnected via the system bus 550 with the processor 510, the memory 520, the storage device 530, and the input/output devices 540. The memory associated with the GPU may store one or more images described herein, and the GPU may process one or more of the images described herein. The GPU may be coupled to and/or form a part of the processor 510. The processor 510 is capable of processing instructions for execution within the computing system 500. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer-readable medium, such as volatile or non-volatile memory, that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed framework specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software frameworks, frameworks, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, “based at least in part on,” such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for managing digital assets in a modular platform, the method comprising:

maintaining a plurality of declarative protocols to standardize interaction semantics between a plurality of digital assets in a protocol repository, wherein a declarative protocol specifies interaction rules for at least one digital asset, and wherein the declarative protocol is configured to support versioning when a predetermined condition is met;

in response to the digital asset being integrated to the modular platform, selecting a declarative protocol from the plurality of declarative protocols; and determining a version of the selected declarative protocol based on a predefined declarative protocol version according to at least one of a digital asset type, a protocol attribute, or an operational requirement;

utilizing an index data structure including a set of indexed parameters to index declarative protocols and corresponding declarative protocol versions to independently register and validate the integrated digital asset thereby enabling efficient digital asset retrieval and declarative protocol version control by maintaining compatibility across different declarative protocol versions and digital asset types according to the set of indexed parameters.

2. The method of claim 1, wherein at least one of the plurality of the declarative protocols comprises structured definitions comprising indexed parameters including at least one or more of interaction rules, versioning information, deployment requirements, security rules, and error handling protocols.

3. The method of claim 2, wherein the digital asset types comprise at least one of a logic rule, a digital feature, an analytical model, or an optimization rule, the method further comprising:

composing two or more assets into an asset package based on the declarative protocols associated with the two or more assets; and deploying the asset package into a specified environment based on the deployment requirements defined in the declarative protocols associated with the two or more assets in a plurality of asset packages.

4. The method of claim 1 further comprising determining a declarative protocol version from a plurality of available versions of the selected declarative protocol based at least in part on the digital asset type, protocol attributes, and predefined operational requirements associated with the digital asset.

5. The method of claim 1, wherein the protocol repository further comprises a version compatibility matrix that maps a declarative protocol version to compatible asset types and operational scenarios to select an optimal declarative protocol version for a selected digital asset type that meets both current and legacy digital asset requirements.

6. The method of claim 1, further comprising implementing access control policies within a declarative protocol, wherein the access control policies define permitted user roles, authentication requirements, and data access levels for interacting with the digital asset.

7. The method of claim 1, further comprising:

in response to a newer version of the selected declarative protocol being available in the protocol repository, verifying compatibility of the newer version with predefined operational requirements for one or more associated assets; and updating the selected protocol version to the newer version if compatibility is verified.

8. A computer program product for managing assets in a modular platform comprising a non-transient machine-readable medium storing instructions that, when executed by at least one programmable processor, cause the at least one programmable processor to perform operations comprising:

maintaining a plurality of declarative protocols to standardize interaction semantics between a plurality of digital assets in a protocol repository, wherein a declarative protocol specifies interaction rules for at least one digital asset, and wherein the declarative protocol is configured to support versioning when a predetermined condition is met;

in response to the digital asset being integrated to the modular platform, selecting a declarative protocol from the plurality of declarative protocols; and determining a version of the selected declarative protocol based on a predefined declarative protocol version according to at least one of a digital asset type, a protocol attribute, or an operational requirement;

utilizing an index data structure including a set of indexed parameters to index declarative protocols and corresponding declarative protocol versions to independently register and validate the integrated digital asset thereby enabling efficient digital asset retrieval and declarative protocol version control by maintaining compatibility across different declarative protocol versions and digital asset types according to the set of indexed parameters.

9. The computer program product of claim 8, wherein at least one of the plurality of declarative protocols comprises structured definitions comprising indexed parameters including at least one or more of interaction rules, versioning information, deployment requirements, security rules, and error handling protocols.

10. The computer program product of claim 9, wherein the digital asset types comprise at least one of a logic rule, a digital feature, an analytical model, or an optimization rule, wherein the operations further comprise:

composing two or more assets into an asset package based on the declarative protocols associated with the two or more assets; and deploying the asset package into a specified environment based on the deployment requirements defined in the declarative protocols associated with the two or more assets in the asset packages.

11. The computer program product of claim 8, wherein the operations further comprise determining a declarative protocol version from a plurality of available versions of the selected protocol based at least in part on the asset type, protocol attributes, and predefined operational requirements associated with the asset.

12. The computer program product of claim 8, wherein the protocol repository further comprises a version compatibility matrix that maps the declarative protocol version to compatible asset types and operational scenarios to select an optimal declarative protocol version for a selected digital asset type that meets both current and legacy digital asset requirements.

13. The computer program product of claim 8, wherein the operations further comprise implementing access control policies within the declarative protocol, wherein the access control policies define permitted user roles, authentication requirements, and data access levels for interacting with the digital asset.

14. The computer program product of claim 8, wherein the operations further comprise:

in response to a newer version of the selected declarative protocol being available in the protocol repository, verifying compatibility of the newer version with predefined operational requirements for one or more associated assets; and updating the selected protocol version to the newer version if compatibility is verified.

15. A system for managing assets in a modular platform, comprising:

At least one programmable processor; and a non-transient machine-readable medium storing instructions that, when executed by the processor, cause the at least one programmable processor to perform operations comprising:

maintaining a plurality of declarative protocols to standardize interaction semantics between a plurality of digital assets in a protocol repository, wherein a declarative protocol specifies interaction rules for at least one digital asset, and wherein the declarative protocol is configured to support versioning when a predetermined condition is met;

in response to the digital asset being integrated to the modular platform, selecting a declarative protocol from the plurality of declarative protocols; and determining a version of the selected declarative protocol based on a predefined declarative protocol version according to at least one of a digital asset type, a protocol attribute, or an operational requirement;

utilizing an index data structure including a set of indexed parameters to index declarative protocols and corresponding declarative protocol versions to independently register and validate the integrated digital asset thereby enabling efficient digital asset retrieval and declarative protocol version control by maintaining compatibility across different declarative protocol versions and digital asset types according to the set of indexed parameters.

16. The system of claim 15, wherein at least one of the plurality of declarative protocols comprises structured definitions comprising indexed parameters including at least one or more of interaction rules, versioning information, deployment requirements, security rules, and error handling protocols.

17. The system of claim 16, wherein the digital asset types comprise at least one of a logic rule, a digital feature, an analytical model, or an optimization rule, wherein the operations further comprise:

composing two or more assets into an asset package based on the declarative protocols associated with the two or more assets; and deploying the asset package into a specified environment based on the deployment requirements defined in the declarative protocols associated with the two or more assets in a plurality of asset packages.

18. The system of claim 15, wherein a declarative protocol version is determined from a plurality of available versions of the selected protocol based at least in part on the asset type, protocol attributes, and predefined operational requirements associated with the asset.

19. The system of claim 15, wherein the protocol repository further comprises a version compatibility matrix that maps a declarative protocol version to compatible asset types and operational scenarios to select an optimal declarative protocol version for a selected digital asset type that meets both current and legacy digital asset requirements.

20. The system of claim 15, wherein the operations further comprise implementing access control policies within a declarative protocol, wherein the access control policies define permitted user roles, authentication requirements, and data access levels for interacting with the digital asset.

* * * * *